United States Patent [19]
Quantz

[11] 3,806,867
[45] Apr. 23, 1974

[54] METHOD AND APPARATUS FOR DETECTING THE UTILIZATION OF A VEHICLE SAFETY BELT

[75] Inventor: Norman G. Quantz, Algonac, Mich.
[73] Assignee: Lectron Products, Inc., Troy, Mich.
[22] Filed: June 4, 1971
[21] Appl. No.: 150,088

[52] U.S. Cl. ........... 340/52 E, 180/82, 280/150 SB, 340/258 C, 340/278
[51] Int. Cl. .......................................... B60r 21/10
[58] Field of Search............ 340/52, 52 E, 278, 279; 280/150 SB; 180/82.8

[56] References Cited
UNITED STATES PATENTS

| | | | |
|---|---|---|---|
| 1,941,740 | 1/1934 | Edwards et al. | 340/258 C X |
| 3,129,415 | 4/1964 | McKnight | 340/258 C |
| 3,133,277 | 5/1964 | Hood | 340/52 E X |
| 3,177,481 | 4/1965 | Joy et al. | 340/279 |
| 3,439,358 | 4/1969 | Salmons | 340/278 UX |
| 3,521,723 | 7/1970 | Snodgrass | 180/82.8 |
| 3,570,621 | 3/1971 | Hampton | 180/82.8 |

FOREIGN PATENTS OR APPLICATIONS 552,918   2/1958   Canada............................ 340/278

OTHER PUBLICATIONS

IBM Technical Disclosure Bulletin, Vol. 7, No. 10, March 1965, page 966.

Displacement Transducer, N. J., Fant, Jr. 340-266.

*Primary Examiner*—John W. Caldwell
*Assistant Examiner*—Kenneth N. Leimer
*Attorney, Agent, or Firm*—Harness, Dickey & Pierce

[57] ABSTRACT

An apparatus for detecting the proper utilization of a safety belt of a vehicle by a vehicle occupant which includes a high frequency oscillator and at least one operatively connected sensing conductor in the safety belt and/or a seat of the vehicle. The proper utilization of the safety belt by the vehicle occupant changes the reactive impedance associated with the sensing conductor to affect the operation of the high frequency oscillator, for example, to completely detune the oscillator to yield a DC output signal which is operative to activate a warning device or ignition interlock device. Preferably, the system includes a first sensing conductor which is carried by the safety belt and which is connected to the oscillator to form a completed R.F. loop when the safety belt is secured, and a second sensing conductor which is positioned in the seat bottom to form a capacitor with the safety belt sensing conductor. The proper utilization of the safety belt by the vehicle occupant affects the capacitance value of the capacitor formed by the sensing conductors and the inductance and capacitance of the R.F. loop to effect the detuning of the oscillator.

28 Claims, 2 Drawing Figures

INVENTOR.
Norman G. Quartz
BY Harness, Dickey & Pierce
ATTORNEYS

METHOD AND APPARATUS FOR DETECTING THE UTILIZATION OF A VEHICLE SAFETY BELT

BACKGROUND AND SUMMARY OF THE INVENTION

Various seat belt utilization detecting devices have been proposed which incorporate a substantial number of switches which are operatively associated with the safety belt for indicating when the safety belt is extended and connected. It will be appreciated that those of the above devices which are reasonably effective are necessarily complex due to the need for a large number of switches and logic elements.

The present invention provides a simplified method and apparatus for detecting the proper utilization of a safety belt by a vehicle occupant. In essence, a safety belt utilization detecting apparatus according to the present invention has at least one sensing conductor which is operatively associated with the safety belt and/or a corresponding vehicle seat which is connected to a circuit for detecting a change in an impedance value associated with the conductor, and especially a change in a reactive impedance value. The apparatus is responsive to a predetermined degree of change of the impedance value which is the result of the proper utilization of the safety belt by the vehicle occupant. The change in reactive impedance to which the circuit is responsive may be a change in capacitance as between a pair of sensing conductors, a first conductor associated with the safety belt and a second conductor associated with the seat, or the change may be a change in inductance and capacitance as in an R. F. loop formed by a single conductor. Each of these changes occur as a result of the position of the vehicle occupant with respect to the sensing conductor(s). The sensing conductors may be arranged and the system may be tuned so as to be responsive to several conditions relating to the safety belt and occupant to detect proper use of the safety belt.

In a specific exemplary embodiment of the present invention, a transistor R. F. oscillator is used. The sensing conductor which is associated with the safety belt includes a conductor portion in each of two safety belt parts. The conductor portions are electrically connectable by latching of the safety belt latch. The belt conductor is connected between the output and the input of the transistor oscillator to provide a feedback circuit. The reactive impedance of the loop, which is substantially inductive in nature, affects the operating frequency of the oscillator and is determined in significant part by the presence of a vehicle occupant within the completed loop. The seat sensing conductor is in the form of a metallic sheet, foil or mesh and is positioned in the bottom part of the seat to capacitively interact with the belt conductor. The capacitor thusly formed is connected to the transistor oscillator to control the tuning thereof in conjunction with the tuning control provided by the belt conductor. The presence of a vehicle occupant on the seat intermediate the seat conductor and the belt conductor changes the average dielectric constant in the capacitive field between the conductors so as to change the capacitance value between the conductors to affect the tuning of the transistor oscillator. Preferably the change in capacitance tends to detune the oscillator. The combined effect of the two tuning means is established so that the transistor oscillator is detuned if, and only if, the safety belt is fastened around an occupant of the vehicle positioned in the seat above the seat conductor. It will be appreciated that detuning of the transistor oscillator results in a DC output current which may be readily detected by a transistor amplifier to provide an amplified output signal representative of the proper utilization of the vehicle safety belt by the vehicle occupant. The signal may be used to disable a warning device or to operate an ignition interlock. It should be noted that a special feature of this invention resides in the fact that the sensing foil within the seats and the conductors in the safety belt carry no current upon detuning of the amplifier, and consequently, no shock hazard is presented to the users of the safety belt.

DETAILED DESCRIPTION OF THE PREFERRED EMBODIMENT

Figures 1, 2:
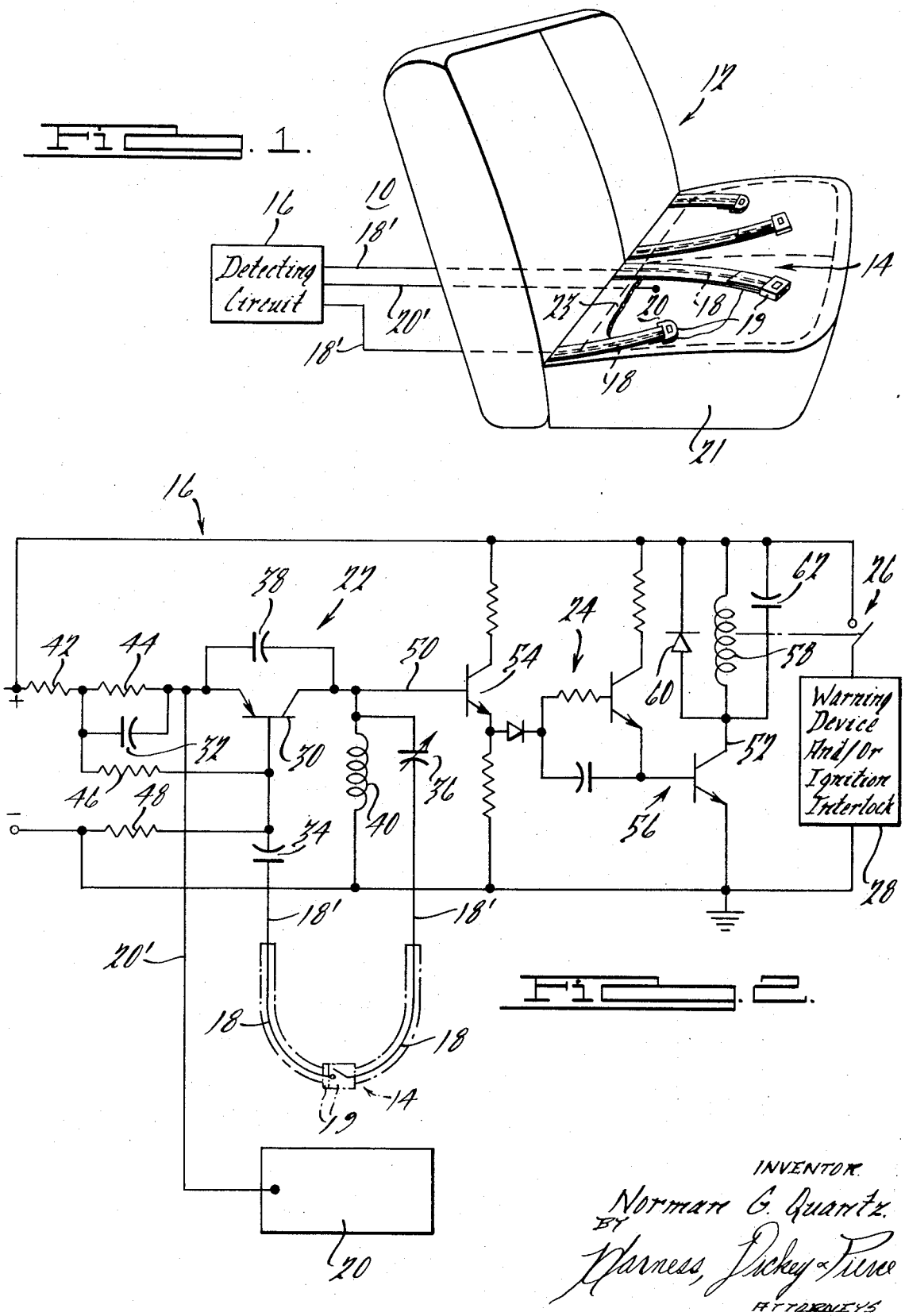
FIG. 1 is an overall view illustrating an exemplary safety belt utilization detecting system according to this invention in combination with a vehicle seat and a safety belt.
FIG. 2 is a circuit diagram of the detecting circuit of the exemplary safety belt utilization detecting system of FIG. 1.

In FIG. 1, a safety belt utilization detecting system 10 is illustrated in operative association with a vehicle seat 12 and a safety belt 14 having two connectable portions. The safety belt 14 may be a seat belt as shown, a shoulder belt, a combination of both, or other safety harness. The safety belt utilization detection system 10 includes a detecting circuit 16, a pair of conductor portions 18, each of which are preferably imbedded or interwoven in respective portions of the safety belt 14, a large surface area conductor 20 which is positioned in the bottom portion 21 of the seat 12 under an outer layer 23 of the seat covering material, and associated conductors extending between the conductors 18 and 20 and the detecting circuit 16 which are indicated by corresponding numbers with prime marks. Te conductor halves 18 are electrically connected to each half of a safety belt buckle 19 so that the conductor halves 18 are electrically connected upon buckling of the safety belt 14. The seat conductor 20 may be a metallic foil, mesh or other extending structure of conducting material.

In the circuit diagram of FIG. 2, the detecting circuit 16 is seen to include a transistor R. F. oscillator section 22, an amplifying section 24, an electrically actuated switch 26, and a warning or ignition interlock device 28.

The R. F. oscillator section 22 includes a transistor 30 which is suitably connected so as to oscillate in the radio frequency (R. F.) range. In the exemplary embodiment shown, a capacitor 32 is used to establish the basic frequency of oscillation of the transistor 30 while the circuit containing the conductors 18 and 20 are operatively connected to effect the tuning of the transistor oscillator 22. Preferably, the transistor oscillator 22 is detuned to a DC, i.e., zero frequency, when the safety belt 14 is properly fastened about a vehicle occupant sitting in the seat 12 above the conductor 20.

It can be seen that the belt conductor 18 forms a capacitor with the seat conductor 20 which is inserted into the oscillator circuit 22 between the base and emitter of the transistor 30 in parallel with the capacitor 32.

Additionally, it can be seen that the conductor 18 is connected between the base and the collector of transistor 30 through a fixed tuning capacitor 34 and a variable tuning capacitor 36, the latter being suitable for adjusting the sensitivity of the detecting circuit 16. It will be appreciated that the loop formed by the completed conductor 18 may be primarily described as inductor. However, the loop does have some capacitive value. Accordingly, it may be said that the conductor 18 singularly, and the conductors 18 and 20 in combination contribute reactive impedance to the oscillator circuit 22.

The transistor oscillator 22 further includes a capacitor 38 for shaping the oscillator output, and particularly, for increasing the width of the oscillator output pulses. A filter coil 40 is incorporated for removing any low frequency voltage component from the oscillator output pulses. The transistor oscillator 22 is also provided with current limiting resistors 42 and 44 and bias resistors 46 and 48 in a well-known manner.

The transistor oscillator 22 has an output line 50 for transmission of a DC signal which occurs upon detoning of the transistor oscillator 22. The DC signal on line 50 is amplified by the amplifying section 24 to provide an amplified output signal on line 52. In one exemplary form of an amplifying section 24, a common emitter transistor amplifier 54 and a "Darlington pair" amplifier 56 are connected in tandem. The construction of each of the above amplifiers are well known to the art, and accordingly, a complete description of each will not be given herein. It will be understood, however, that the amplifier section 24 may take other forms which are well known to those skilled in the art.

The output line 52 of the amplifier section 24 is connected to a coil portion 58 of the solenoid switch 26 so that a current on the output line 52 is effective to close the solenoid switch 26, and in turn, to deactivate a warning device and/or an ignition interlock. The coil 58 of the solenoid switch 26 is connected in parallel with a diode 60 which prevents excessive transients on opening of the solenoid switch 26 and a capacitor 62 which delays the closing of the solenoid switch 26 to prevent chatter of the switch contacts during the initial portion of a signal on line 52.

In use, when the safety belt 14 is properly fastened about a vehicle occupant, the conductor 18 is completed to form a loop. Radio frequency energy generated at the collector of the transistor 30 is fed to the conductor 18, and to some degree is transmitted into the space surrounding the conductor 18 so that the energy returned to the base of the transistor 30 is affected by the presence or absence of an occupant within the loop so as to affect the tuning of the oscillator 22. It will be appreciated that the predominant effect is a change in the inductive impedance of the conductor 18, although some capacitive effects are realized. Additionally, the impedance of the capacitor consisting of the belt conductor 18 and the seat conductor 20 indicates the positioning of the safety belt 14 over the lap of the passenger. In this regard, the capacitive impedance of the capacitor is affected by the change in the dielectric medium intermediate the belt conductor 18 and the seat conductor 20 and the change in the spacing of the conductor 18 and the foil 20. The circuit may be tuned to distinguish the fastening of the safety belt 14 about a human body as opposed to the fastening of the safety belt 14 about a dielectrically dissimilar body such as a bag of groceries. The capacitive impedance of the capacitor formed by belt conductor 18 and seat conductor 20 also tends to detune the transistor oscillator 22 upon proper utilization of the safety belt 14 such that the combined affects of the tuning loop formed about the occupant by the fastening of the safety belt 14 and the capacitor formed by positioning the belt 14 over the lap of the occupant provides the appropriate conditions for the complete detuning of the transistor oscillator 22 to yield a DC signal on line 50. The DC signal on line 50, amplified in amplifier section 24, is operative to activate the warning device and/or ignition interlock 28. In view of the above explanation of the operation of the system 10, it will be appreciated that the existance of all of the conditions of proper utilization of the safety belt are determined by the system 10 in a manner which is simple but effective.

It should be noted that the detuning of the oscillator 22 removes the RF current from the conductors 18 and 20. In addition, the conductor 18 is isolated from the oscillator 22 with respect to DC currents by the capacitors 34 and 36. Consequently, an occupant using the safety belt 14 is not exposed to AC or DC electrical energy. Also, since the device relies on changes in reactive impedance, as opposed to DC switching, very samll current levels may be utilized. Therefore, the conductor 18 within the belt may be of very small gauge, and of consequent high resistance, such that the switch at the belt bucklet 19 may have a relatively high resistance without having a critical effective on the operation of the system 10.

In view of the above description of the safety belt utilization detecting system 10, it will be appreciated that a simple but reliable system is disclosed which may be constructed at modest cost using solid-state circuit techniques. Moreover, the system can be made exceptionally small in size so as to be conveniently positionable in many locations in the vehicle.

While it will be apparent that the teachings herein are well calculated to teach one skilled in the art the method of making the preferred embodiment of this invention, it will be appreciated that the invention is susceptible to modification, variation and change without departing from the proper scope of meaning of the subjoined claims.

What is claimed is:

1. In a vehicle having an occupant seat and safety belt means including securing means for holding said safety belt means about the occupant for restraining the occupant, an apparatus comprising:

first conductor means carried by and extending along said safety belt means; and circuit means connected to said first conductor means including oscillating means for supplying oscillating electrical energy to said first conductor means;

said first conductor means providing a reactive impedance for said oscillating means so that said first conductor means is operatively cooperating with said oscillating means, the value of said reactive impedance of said first conductor means being changed from a first value when said safety belt means is not about said occupant to a second value when said safety belt means is held about said occupant by said securing means so that said first conductor means at least partly surrounds said occupant said circuit means including means for providing an output signal at least in part in response to said change from said first value to said second value of the reactive impedance of said first conductor means for detecting the utilization of said safety belt means by said occupant with said securing means holding said safety belt means about said occupant.

2. An apparatus according to claim 1 wherein said reactive impedance includes a capacitance and wherein said circuit means at least in part detects a change in said capacitance.

3. An apparatus according to claim 1 wherein said reactive impedance includes an inductance and wherein said circuit means at least in part detects a change in said inductance.

4. An apparatus according to claim 1 wherein said oscillating means for supplying oscillating electrical energy supplies high frequency electrical energy to said conductor means.

5. An apparatus according to claim 4 wherein said reactive impedance change affected by the presence of said occupant includes a change in inductance and wherein said circuit means at least in part detects said change in inductance.

6. An apparatus according to claim 5 wherein said high frequency energy is provided at a preselected frequency and wherein said change in inductance changes the frequency of said high frequency energy.

7. An apparatus according to claim 5 wherein said frequency is changed to zero frequency by said utilization of said safety belt means by said occupant with said securing means holding said safety belt means about said occupant and wherein said circuit means detects said zero frequency energy.

8. An apparatus according to claim 1 further including a second conductor means connected to said circuit means and associated with said first conductor means so as to form a capacitor therebetween, the utilization of said safety belt means by said occupant with said securing means holding said safety belt means about said occupant affects the capacitance of said capacitor between said conductors, and said circuit means detects said change in said capacitance.

9. An apparatus according to claim 8 wherein said oscillating means for supplying oscillating electrical energy supplies high frequency electrical energy to said conductor means, and said capacitor between said second conductor means and said first conductor means is connected to said oscillating means for varying the frequency of said oscillating means in accordance with said capacitance.

10. An apparatus according to claim 9 wherein said change in capacitance value causes said frequency of said oscillating means to be decreased to a predetermined degree, and said circuit means detects said predetermined degree of decrease of said frequency.

11. An apparatus according to claim 8 wherein said oscillating means for supplying oscillating electrical energy supplies high frequency energy to at least one of said first and second conductor means, said reactive impedance change in accordance with a predetermined positional relationship of said occupant with said first conductor means includes a change in inductance of said one conductor means, and said circuit means detects said change in inductance.

12. An apparatus according to claim 11 wherein said oscillating means provides high frequency energy at a preselected frequency and wherein said change in inductance and capacitance jointly change the frequency of said oscillating means.

13. An apparatus according to claim 12 wherein said frequency of said oscillating means is changed to zero frequency by said utilization of said safety belt means by said occupant with said securing means holding said safety belt means about said occupant and wherein said circuit means detects said zero frequency of said oscillating means.

14. In a vehicle having an occupant seat and safety belt means including securing means for holding said safety belt means about the occupant for restraining the vehicle occupant, an apparatus comprising:
first conductor means associated with and extending along said safety belt means;
circuit means connected to said first conductor means including oscillating means for supplying high frequency oscillating electrical energy to said first conductor means, said first conductor means being adapted to radiate at least a portion of said high frequency electrical energy to the surroundings of said first conductor means so that when said safety belt means is held about said occupant by said securing means to position said first conductor means at least partly about said occupant the radiation of said high frequency electrical energy is affected to in turn result in a change in the operation of said oscillating means; and
said circuit means further including means responsive at least in part to said change in the operation of said oscillating means for detecting the utilization of said safety belt by said occupant with said securing means holding said safety belt means about said occupant and for providing an output signal representative thereof.

15. An apparatus according to claim 14 wherein said oscillating means provides said high frequency energy at a preselected frequency and wherein said change in operation of said oscillating means is a change in the frequency of oscillation of said oscillating means.

16. An apparatus according to claim 15 wherein said frequency of said oscillating means is changed to zero frequency by said utilization of said safety belt means by said occupant with said securing means holding said safety belt means about said occupant and wherein said circuit means detects said zero frequency energy.

17. In a vehicle having an occupant seat and safety belt means including securing means for holding said safety belt means about the occupant for restraining the vehicle occupant, an apparatus comprising:
first conductor means associated with and extending along said belt means;
circuit means connected to said first conductor means including oscillating means for supplying high frequency electrical energy to said conductor means, said conductor means being adapted to radiate at least a portion of said high frequency electrical energy to the surroundings of said conductor means wherein the utilization of said safety belt means by said occupant with said securing means holding said safety belt means about said occupant and said conductor means extending at least partly about said occupant affects said high frequency electrical energy radiated from said conductor means thereby changing the operation of said circuit means; and said circuit means further including means responsive at least in part to said change in the operation of said circuit means due to said utilization of said safety belt by said occupant with said securing means holding said safety belt means about said occupant for detecting the utilization of said safety belt means by said occupant with said securing means holding said safety belt means about said occupant and for providing an output signal representative thereof.

18. An apparatus according to claim 17 wherein said oscillating means provides said high frequency energy at a preselected frequency and wherein said change in said operation of said circuit means is a change in the frequency of oscillation of said oscillating means.

19. In a vehicle having an occupant seat and safety belt means including securing means for holding said safety belt means about the occupant for restraining the vehicle occupant, an apparatus comprising:

first conductor means associated with said safety belt means;

second conductor means associated with said seat;

circuit means connected to said first and second conductor means including supply means for supplying electrical energy to said first and second conductor means with said supply means including oscillating means for providing oscillating electrical energy to at least one of said first and second conductor means;

said at least one of said first and second conductor means providing a reactive impedance for said circuit means with the reactive impedance of said at least one of said first and second conductor means being changed in accordance with a predetermined positional relationship of said occupant with said at least one of said first and second conductor means; and said circuit means being sensitive to said change in reactive impedance for detecting said change in the reactive impedance of said at least one of said first and second conductor means including means responsive at least in part to said detected change in reactive impedance and a change in said electrical energy supplied to the other of said first and second conductor means for detecting the utilization of said safety belt means by said occupant with said securing means holding said safety belt means about said occupant and for providing an output signal representative thereof.

20. An apparatus according to claim 19 wherein said reactive impedance includes a capacitance and wherein said circuit means detects a change in said capacitance.

21. An apparatus according to claim 19 wherein said reactive impedance includes an inductance and wherein said circuit means detects a change in said inductance.

22. An apparatus according to claim 19 wherein said safety belt means includes a pair of safety belt means portions and said securing means includes connection means for said safety belt means for connecting said pair of safety belt means portions about said occupant, and wherein said first conductor means comprises a pair of first conductor means portions which are electrically connected at said connection means when said safety belt means is held about said occupant.

23. An apparatus according to claim 19 wherein said reactive impedance is changed upon the utilization of said safety belt means by said occupant with said securing means holding said safety belt means about said occupant subsequent to said change in accordance with the predetermined positional relationship of said occupant with said at least one of said first and second conductor means and wherein said circuit means provides an output signal representative of said change in reactive impedance of said first conductor means upon the utilization of said safety belt means by said occupant with said securing means holding said safety belt means about said occupant.

24. An apparatus according to claim 23 wherein said first conductor means is said at least one of said first and second conductor means and said first conductor means forms a RF loop when said securing means holds said safety belt means about said occupant.

25. An apparatus according to claim 24 wherein said first and second conductor means form a capacitor therebetween which has a value which is different when said occupant is interposed between said first and second conductor means when said securing means holds said safety belt means about the occupant relative to the value of said capacitor when said occupant is not interposed between said first and second conductor means, and wherein said circuit means provides an output signal representative of said difference in said capacitance between said first and second conductor means.

26. An apparatus according to claim 19 wherein said first and second conductor means form a capacitor therebetween which has a value which is different when said occupant is interposed between said first and second conductor means when said securing means holds said safety belt means about the occupant relative to the value of said capacitor when said occupant is not interposed between said first and second conductor means, and wherein said circuit means provides an output signal representative of said difference in capacitance between said first and second conductor means.

27. In a vehicle having an occupant seat and safety belt means including securing means for holding said safety belt means about the occupant for restraining the vehicle occupant, an apparatus comprising:

first conductor means carried by and extending along said safety belt means;

second conductor means carried by said seat and positioned adjacent said occupant;

circuit means including oscillating means connected to said first and second conductor means for supplying oscillating electrical energy to said first and second conductor means;

said first and second conductor means providing reactive impedance for said oscillating means, the reactive impedance of said first and second conductor means being changed from a first value when said safety belt means is not about said occupant to a second value upon the utilization of said safety belt means by said occupant with said securing means holding said safety belt means about said occupant so that said first conductor means at least partly surrounds said occupant and said occupant is interposed between said first and second conductor means; and said circuit means including means for providing an output signal at least in part in response to said change in the reactive impedance of said first and second conductor means from said first value to said second value for detecting the utilization of said safety belt means by said occupant with said securing means holding said safety belt about said occupant.

28. An apparatus according to claim 27 wherein said first and second conductor means form a capacitor therebetween which has a value which is different when said occupant is interposed between said first and second conductor means when said securing means holds said safety belt means about the occupant relative to the value of said capacitor when said occupant is not interposed between said first and second conductor means, and wherein said circuit means provides an output signal representative of said difference in capacitance between said first and second conductor means.

* * * * *